(12) United States Patent
Jackson et al.

(10) Patent No.: US 9,376,591 B2
(45) Date of Patent: Jun. 28, 2016

(54) WATER COLOR PAINT SYSTEM

(71) Applicant: Golden Artist Colors, Inc., New Berlin, NY (US)

(72) Inventors: Ulysses Grosch Jackson, South New Berlin, NY (US); Mark Golden, Earlville, NY (US); James Martin Hayes, New Berlin, NY (US)

(73) Assignee: Golden Artist Colors, Inc., New Berlin, NY (US)

( * ) Notice: Subject to any disclaimer, the term of this patent is extended or adjusted under 35 U.S.C. 154(b) by 0 days.

(21) Appl. No.: 14/626,264

(22) Filed: Feb. 19, 2015

(65) Prior Publication Data

US 2015/0232696 A1    Aug. 20, 2015

Related U.S. Application Data

(60) Provisional application No. 61/942,016, filed on Feb. 19, 2014.

(51) Int. Cl.
| | | |
|---|---|---|
| *C08K 3/30* | (2006.01) | |
| *C09D 177/00* | (2006.01) | |
| *C09D 179/02* | (2006.01) | |
| *C08G 73/02* | (2006.01) | |

(52) U.S. Cl.
CPC .......... *C09D 177/00* (2013.01); *C08G 73/0233* (2013.01); *C09D 179/02* (2013.01)

(58) Field of Classification Search
CPC ............................ C09D 177/00; C09D 179/02
See application file for complete search history.

(56) References Cited

U.S. PATENT DOCUMENTS

2011/0263752 A1 *  10/2011  Hiraishi .............. C09D 11/322
                                                       523/310

* cited by examiner

*Primary Examiner* — Robert Harlan
(74) *Attorney, Agent, or Firm* — Dale F. Regelman; Quarles & Brady LLP

(57) ABSTRACT

A water color paint system which includes water, pigment, and polymeric binder.

18 Claims, 2 Drawing Sheets

FIG. 1A

|        | A  | B  | C  | D  | E  | F  | G  | H  |
|--------|----|----|----|----|----|----|----|----|
| PIGMENT | 55 | 55 | 55 | 55 | 50 | 50 | 50 | 50 |
| BINDER | 15 | 20 | 25 | 30 | 15 | 20 | 25 | 30 |

FIG. 1B

|        | I  | J  | K  | L  | M  | N  | O  | P  |
|--------|----|----|----|----|----|----|----|----|
| PIGMENT | 45 | 45 | 45 | 45 | 40 | 40 | 40 | 40 |
| BINDER | 15 | 20 | 25 | 30 | 15 | 20 | 25 | 30 |

FIG. 1C

|        | Q  | R  | S  | T  | U  | V  | W  | X  |
|--------|----|----|----|----|----|----|----|----|
| PIGMENT | 35 | 35 | 35 | 35 | 30 | 30 | 30 | 30 |
| BINDER | 15 | 20 | 25 | 30 | 15 | 20 | 25 | 30 |

FIG. 1D

| | AA | AB | AC | AD | AE | AF | AG | AH |
|---|---|---|---|---|---|---|---|---|
| PIGMENT | 25 | 25 | 25 | 25 | 20 | 20 | 20 | 20 |
| BINDER | 15 | 20 | 25 | 30 | 15 | 20 | 25 | 30 |

FIG. 1E

| | AI | AJ | AK | AL | AM | AN | AO | AP |
|---|---|---|---|---|---|---|---|---|
| PIGMENT | 15 | 15 | 15 | 15 | 10 | 10 | 10 | 10 |
| BINDER | 15 | 20 | 25 | 30 | 15 | 20 | 25 | 30 |

WATER COLOR PAINT SYSTEM

CROSS REFERENCE TO RELATED APPLICATIONS

This is a Non-Provisional application claiming priority to a U.S. Provisional Application having Ser. No. 61/942,016, filed on Feb. 19, 2014, which claim is hereby incorporated by reference herein.

FIELD OF THE INVENTION

This invention relates to a water color paint formulation.

BACKGROUND OF THE INVENTION

Watercolor is a painting method in which the paints are made of pigments suspended in a water-soluble vehicle. The term "watercolor" refers to both the medium and the resulting artwork. The traditional and most common support for watercolor paintings is paper; other supports include papyrus, bark papers, plastics, vellum or leather, fabric, wood, and canvas. Watercolors are usually transparent, and appear luminous because the pigments are laid down in a relatively pure form with few fillers obscuring the pigment colors.

SUMMARY OF THE INVENTION

A water color paint system is disclosed, wherein that water color paint system includes water, a pigment, and a polymeric binder. In certain embodiments, the water is present at between zero weight percent and about 50 weight percent. In certain embodiments, the polymeric binder consists of a water-soluble substituted polyethyleneimine.

BRIEF DESCRIPTION OF THE DRAWINGS

The invention will be better understood from a reading of the following detailed description taken in conjunction with the drawings in which like reference designators are used to designate like elements, and in which:

FIGS. 1A, 1B, 1C, 1D, and 1E, summarize the relative parts of poly-2-ethyl-2-oxazoline binder and pigments for paint formulations A through AP. Formulations A through AP may optionally include water at a weight percentage of between 0 weight percent and about 50 weight percent. Formulations A through AP may also optionally include propylene glycol at a weight percentage of between 0 weight percent and about 10 weight percent. Formulations A through AP may also optionally include polyethylene glycol at a weight percentage of between 0 weight percent and about 10 weight percent.

DETAILED DESCRIPTION OF PREFERRED EMBODIMENTS

This invention is described in preferred embodiments in the following description. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and an forth.

Applicants water color paint system comprises one or more pigments. In certain embodiments, the one or more pigments comprise more than fifty weight percent (50 wt %) of Applicants' water color paint system. In other embodiments, the one or more pigments comprise about ten weight percent (10 wt %).

A wide variety of organic and inorganic pigments, alone or in combination with additional pigments or dyes can be used in Applicants water color paint system. The exact choice of pigments will depend upon the specific application and performance requirements Pigments suitable for use in the invention include, but are not limited to, mixed metal oxides, azo pigments, monoazo pigments, di-azo pigments, azo pigment lakes, β-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrroto pyrrole pigments, titanium oxide, iron oxide, and carbon black.

In certain embodiments, Applicants' water color paint system further comprises water and a water-soluble polymeric binder. By "water-soluble," Applicants mean that a mixture of the polymeric binder and water is homogeneous.

Certain embodiments of Applicants' paint system comprise no water. In certain embodiments, Applicants "water color cake" paint system is initially formed in an aqueous solution, and the water is subsequently removed. In certain embodiments, Applicants' water color cake embodiments are almost instantly resoluble at the surface using a wet brush and water.

In Applicants' water color paint system, the binder forms a continuous film upon drying. In addition, the binder affects the adhesion of the dried paint film to a substrate.

In certain embodiments, the weight percentage of the water is substantially equal to the weight percentage of the water-soluble polymeric binder. By "substantially equal to," Applicants mean plus or minus about ten percent (10%).

In certain embodiments, Applicants' water color paint system comprises between about 15 weight percent and about 25 weight percent water. In certain embodiments, Applicants' water color paint system comprises between about 15 weight percent and about 25 weight percent water-soluble polymeric binder.

In certain embodiments, Applicants' water-soluble polymeric binder comprises poly N-vinylpyrrolidone I.

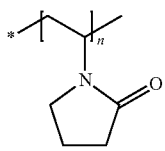

In certain embodiments, Applicants' water-soluble polymeric binder a substituted polyethyleneimine II, wherein n is between about 40 and about 450.

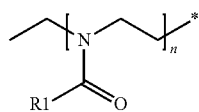

In certain embodiments, R1 is selected from the group consisting of methyl, ethyl, and propyl. In certain embodiments, R1 is ethyl and polymer II comprises a product sold in commerce under the trade name AQUAZOL by Polymer Chemistry Innovations, Inc., 4231 South Fremont, Tucson, Ariz.

In certain embodiments, Applicants' poly-2-ethyl-2-oxazoline binder comprises a number average molecular weight of about 5000 Daltons. In certain embodiments, Applicants' poly-2-ethyl-2-oxazoline binder comprises a number average molecular weight of about 50,000 Daltons. In certain embodiments, Applicants' poly-2-ethyl-2-oxazoline binder comprises a number average molecular weight of about 500,000 Daltons.

FIGS. 1A, 1B, 1C, 1D, and 1E, summarize the relative parts of poly-2-ethyl-2-oxazoline binder and pigments for paint formulations A through AP. Formulations A through AP may optionally include water at a weight percentage of between 0 weight percent and about 50 weight percent. Formulations A through AP may also optionally include propylene glycol at a weight percentage of between 0 weight percent and about 10 weight percent. Formulations A through AP may also optionally include polyethylene glycol at a weight percentage of between 0 weight percent and about 10 weight percent.

Applicants have found that use of a poly 2-ethyl-2-oxaline binder gives a paint system comprising much enhanced film integrity, even with high pigment loadings. Applicants' paint system showed superior bend test results when tested using a mandrel bend test per ASTM D 522 Standard Test Methods for Mandrel Bend Test of Attached Organic Coatings. The mandrel bending test is a commonly used testing method for assessing coating flexibility by subjecting coated test panels to bending over a series of progressively-sized cylinders. Decreasing diameter size directly correlates to greater coating flexibility. Testing with the cylindrical mandrel bending tester determines the greatest cylinder diameter at which a coating will show cracking or flaking upon bending.

A painted substrate is bent over a mandrel causing the coated surface to become elongated. In this test, a painted test panel is bent 180° around a specified diameter steel rod.

Table 1 recites mandrel bend testing results for prior art paint systems after a 6 day cure at 73° F. and 53% relative humidity.

TABLE 1

| | Point of Failure-6 day cure @ 73 F./53% RH Mandrel Diameter | | | | | | | |
|---|---|---|---|---|---|---|---|---|
| | Cracked as it cured | 1" | 3/4" | 5/8" | 1/2" | 3/8" | 1/4" | <1/4" |
| Gum Arabic with PEG; Titanium White (21% Binder, 43% Pigment) | x | | | | | | | |
| Gum Arabic with PEG; Zinc White (20% Binder, 46% Pigment) | x | | | | | | | |
| Gum Arabic with PEG; Ultramarine Blue (21% Binder, 43% Pigment) | x | | | | | | | |
| Gum Arabic with PEG; Dioxazine Purple (32% Binder, 14% Pigment) | x | | | | | | | |
| Gum Arabic with Glycerine; Titanium White (21% Binder, 43% Pigment) | x | | | | | | | |
| Gum Arabic with Glycerine; Zinc White (20% Binder, 46% Pigment) | | x | | | | | | |
| Gum Arabic with Glycerine; Ultramarine Blue (21% Binder, 43% Pigment) | x | | | | | | | |
| Gum Arabic with Glycerine; Dioxazine Purple (32% Binder, 14% Pigment) | x | | | | | | | |

The data recited in TABLE 1 show that prior art Gum Arabic binder paint systems generally showed poor film formation at binder loadings of 14 weight percent to 32 weight percent. The observed cracking reflects a critical volume concentration being exceeded. These prior art systems comprise too great a pigment to binder ratio. As a result, these prior art paint systems do not form a continuous film upon drying.

TABLE 2 recites mandrel bending test results for certain embodiments of Applicants' paint system after a 6 day cure at 73° F. and 53% relative humidity.

TABLE 2

| | Point of Failure-6 day cure @ 73 F./53% RH Mandrel Diameter | | | | | | | |
|---|---|---|---|---|---|---|---|---|
| | Cracked as it cured | 1" | 3/4" | 5/8" | 1/2" | 3/8" | 1/4" | <1/4" |
| Aquazol 5 with PEG; Titanium White (21% Binder, 43% Pigment) | | | | | | | | x |
| Aquazol 5 with PEG; Zinc White (20% Binder, 46% Pigment) | | | | | | | | x |

TABLE 2-continued

|  | Point of Failure-6 day cure @ 73 F./53% RH Mandrel Diameter | | | | | | | |
|---|---|---|---|---|---|---|---|---|
|  | Cracked as it cured | 1" | 3/4" | 5/8" | 1/2" | 3/8" | 1/4" | <1/4" |
| Aquazol 5 with PEG; Ultramarine Blue (21% Binder, 43% Pigment) | | | | | | | | x |
| Aquazol 5 with PEG; Dioxazine Purple (32% Binder, 14% Pigment) | | | | | | | x | |
| Aquazol 50 with PEG; Titanium White (21% Binder, 43% Pigment) | | | | | | | | x |
| Aquazol 50 with PEG; Zinc White (20% Binder, 46% Pigment) | | | | | | | | x |
| Aquazol 50 with PEG; Ultramarine Blue (21% Binder, 43% Pigment) | | | | | | | | x |
| Aquazol 50 with PEG; Dioxazine Purple (32% Binder, 14% Pigment) | | | | | | | x | |

The data of TABLE 2 show that all embodiments of Applicants' paint system comprising between 20 weight percent to 32 weight percent binder, and 14 weight percent pigment to 46 weight percent pigment, show good film formation during the cure period. Moreover, embodiments of Applicants' paint system comprising between 20 weight percent to 32 weight percent binder, and 14 weight percent pigment to 46 weight percent pigment, only showed cracking/flaking when bent around a mandrel having a diameter of 0.25 inch.

TABLE 3 recites mandrel bend testing results for certain embodiments of Applicants' paint system after a 6 day cure at 73° F. and 53% relative humidity, and a subsequent 9 day treatment at 120° F. None of the prior art paint systems of TABLE 2 survived the 9 day exposure to 120° F.

TABLE 3

|  | Point of Failure-6 day cure @ 73 F./53% RH + 9 days at 120 F. Mandrel Diameter | | | | | | | |
|---|---|---|---|---|---|---|---|---|
|  | Cracked as it cured | 1" | 3/4" | 5/8" | 1/2" | 3/8" | 1/4" | <1/4" |
| Aquazol 5 with PEG: Titanium White (21% Binder, 43% Pigment) | x | | | | | | | |
| Aquazol 5 with PEG; Zinc White (20% Binder, 46% Pigment) | | x | | | | | | |
| Aquazol 5 with PEG; Ultramarine Blue (21% Binder, 43% Pigment) | | x | | | | | | |
| Aquazol 5 with PEG; Dioxazine Purple (32% Binder, 14% Pigment) | | x | | | | | | |
| Aquazol 50 with PEG; Titanium White (21% Binder, 43% Pigment) | | | | | x | | | |
| Aquazol 50 with PEG; Zinc White (20% Binder, 46% Pigment) | | x | | | | | | |
| Aquazol 50 with PEG; Ultramarine Blue (21% Binder, 43% Pigment) | | x | | | | | | |
| Aquazol 50 with PEG; Dioxazine Purple (32% Binder, 14% Pigment) | | x | | | | | | |

As those skilled in the art will appreciate, exposure for 9 days at 120° F. is an extreme test of the stability of a cured, water-color paint system. Nevertheless, all of Applicants' tested paint system embodiments survived such a 9 day/120° F. exposure.

In certain embodiments, Applicants' water color paint system is dramatically sheer-thinning. In these embodiments, Applicants' water color paint system comprises a non-Newtonian fluid.

Shear thinning is an effect where a fluid's viscosity—the measure of a fluid's resistance to flow—decreases with an increasing rate of shear stress. Another name for a shear thinning fluid is a pseudoplastic.

The pseudoplasticity of Applicants' water color paint system causes that composition to undergo a change in viscosity due to the sheering stress resulting from agitation/vibration. The internal structure of Applicants' water color paint system can sustain the stress forces for a short period of time referred to as a relaxation time. In certain embodiments, Applicants' water color paint system comprises a viscosity of about 25,000 centipoises at room temperature. In certain embodiments, moderate to vigorous stirring of Applicants' water color paint system can lower the room temperature viscosity to between about 5,000 to about 15,000 centipoises.

While the preferred embodiments of the present invention have been illustrated in detail, it should be apparent that modifications and adaptations to those embodiments may occur to one skilled in the art without departing from the scope of the present invention as set forth herein.

We claim:

1. A water color paint system, comprising:
   water;
   a pigment; and
   a polymeric binder consisting of a water-soluble substituted polyethyleneimine having a structure:

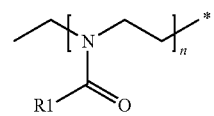

wherein R1 is selected from the group consisting of methyl, ethyl, and propyl, and wherein n is between about 40 and about 450; and wherein said water-soluble, substituted polyethyleneimine is present at about twenty weight percent.

2. The water color system of claim 1, wherein said water is present at between zero weight percent and about 50 weight percent.

3. The water color system of claim 1, wherein said water-soluble, substituted polyethyleneimine has a number average molecular weight of about 5,000 Daltons.

4. The water color system of claim 1, further comprising:
   polyethylene glycol at a level between about 2 weight percent and about 10 weight percent;

wherein dried test panels coated with said water color paint system did not show cracking or flaking of the paint when bent around a mandrel having a diameter greater than 0.25 inches.

5. The water color paint system of claim 4, wherein a weight percent of said water is substantially equal to a weight percent of said polymeric binder.

6. The water color system of claim 1, wherein said water-soluble, substituted polyethyleneimine is present at about fourteen weight percent.

7. The water color system of claim 6, wherein said water-soluble, substituted polyethyleneimine has a number average molecular weight of about 5,000 Daltons.

8. The water color system of claim 6, further comprising:
polyethylene glycol at a level between about 2 weight percent and about 10 weight percent;
wherein test panels coated with said water color paint system and subjected to a six day cure at 73° F. at 53 percent relative humidity did not show cracking or flaking of the paint when bent around a mandrel having a diameter greater than 0.25 inches.

9. The water color paint system of claim 8, wherein a weight percent of said water is substantially equal to a weight percent of said polymeric binder.

10. The water color system of claim 1, wherein said water-soluble, substituted polyethyleneimine has a number average molecular weight of about 50,000 Daltons.

11. The water color system of claim 10, wherein said water-soluble, substituted polyethyleneimine is present at about twenty weight percent.

12. The water color system of claim 10, further comprising:
polyethylene glycol at a level between about 2 weight percent and about 10 weight percent;
wherein dried test panels coated with said water color paint system did not show cracking or flaking of the paint when bent around a mandrel having a diameter greater than 0.25 inches.

13. The water color paint system of claim 10, wherein a weight percent of said water is substantially equal to a weight percent of said polymeric binder.

14. The water color system of claim 10, wherein said water-soluble, substituted polyethyleneimine is present at about thirty-two weight percent.

15. The water color system of claim 14, further comprising:
polyethylene glycol at a level between about 2 weight percent and about 10 weight percent;
wherein dried test panels coated with said water color paint system did not show cracking or flaking of the paint when bent around a mandrel having a diameter of greater than 0.25 inches.

16. The water color paint system of claim 14, wherein a weight percent of said water is substantially equal to a weight percent of said polymeric binder.

17. The water color paint system of claim 1, wherein said water color paint system comprises a sheer thinning fluid.

18. The water color paint system of claim 17, wherein:
said unstirred water color paint system comprises a viscosity of about 25,000 centipoises at room temperature;
when vigorously stirred, said unstirred water color paint system comprises a viscosity between about 5,000 to about 15,000 centipoises at room temperature.

* * * * *